United States Patent
Xiong et al.

(10) Patent No.: US 11,562,287 B2
(45) Date of Patent: Jan. 24, 2023

(54) HIERARCHICAL AND INTERPRETABLE SKILL ACQUISITION IN MULTI-TASK REINFORCEMENT LEARNING

(71) Applicant: salesforce.com, inc., San Francisco, CA (US)

(72) Inventors: Caiming Xiong, Palo Alto, CA (US); Tianmin Shu, San Francisco, CA (US); Richard Socher, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 1396 days.

(21) Appl. No.: 15/885,727

(22) Filed: Jan. 31, 2018

(65) Prior Publication Data

US 2019/0130312 A1    May 2, 2019

Related U.S. Application Data

(60) Provisional application No. 62/578,366, filed on Oct. 27, 2017, provisional application No. 62/578,377, filed on Oct. 27, 2017.

(51) Int. Cl.
| | | |
|---|---|---|
| *G06N 20/00* | (2019.01) | |
| *G06N 3/08* | (2006.01) | |
| (Continued) | | |

(52) U.S. Cl.
CPC ........... *G06N 20/00* (2019.01); *G06F 9/4881* (2013.01); *G06N 3/0454* (2013.01); *G06N 3/08* (2013.01)

(58) Field of Classification Search
CPC ......... G06N 3/02; G06N 3/0454; G06N 3/063
See application file for complete search history.

(56) References Cited

U.S. PATENT DOCUMENTS

| | | |
|---|---|---|
| 8,775,341 B1 | 7/2014 | Commons |
| 9,053,431 B1 | 6/2015 | Commons |
| (Continued) | | |

OTHER PUBLICATIONS

Yin, Haiyan, and Sinno Jialin Pan. "Knowledge transfer for deep reinforcement learning with hierarchical experience replay." Thirty-First AAAI conference on artificial intelligence. 2017. (Year: 2017).*

(Continued)

*Primary Examiner* — Kakali Chaki
*Assistant Examiner* — Michael H Hoang
(74) *Attorney, Agent, or Firm* — Haynes and Boone LLP

(57) ABSTRACT

The disclosed technology reveals a hierarchical policy network, for use by a software agent, to accomplish an objective that requires execution of multiple tasks. A terminal policy learned by training the agent on a terminal task set, serves as a base task set of the intermediate task set. An intermediate policy learned by training the agent on an intermediate task set serves as a base policy of the top policy. A top policy learned by training the agent on a top task set serves as a base task set of the top task set. The agent is configurable to accomplish the objective by traversal of the hierarchical policy network. A current task in a current task set is executed by executing a previously-learned task selected from a corresponding base task set governed by a corresponding base policy, or performing a primitive action selected from a library of primitive actions.

22 Claims, 10 Drawing Sheets

(51) Int. Cl.
  G06F 9/48 (2006.01)
  G06N 3/04 (2006.01)

(56) References Cited

U.S. PATENT DOCUMENTS

| | | |
|---|---|---|
| 9,594,983 B2 | 3/2017 | Alattar et al. |
| 10,121,467 B1 | 11/2018 | Gandhe et al. |
| 10,282,663 B2 | 5/2019 | Socher et al. |
| 10,346,721 B2 | 7/2019 | Albright et al. |
| 10,573,295 B2 | 2/2020 | Zhou et al. |
| 2009/0234467 A1 | 9/2009 | Sabe et al. |
| 2014/0257803 A1 | 9/2014 | Yu et al. |
| 2015/0055855 A1 | 2/2015 | Alattar et al. |
| 2016/0350653 A1 | 12/2016 | Socher et al. |
| 2017/0024645 A1 | 1/2017 | Socher et al. |
| 2017/0032280 A1 | 2/2017 | Socher et al. |
| 2017/0140240 A1 | 5/2017 | Socher et al. |
| 2017/0148433 A1 | 5/2017 | Catanzaro et al. |
| 2018/0082171 A1 | 3/2018 | Merity et al. |
| 2018/0096219 A1 | 4/2018 | Socher |
| 2018/0096267 A1 | 4/2018 | Masekara et al. |
| 2018/0121787 A1 | 5/2018 | Hashimoto et al. |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0143966 A1 | 5/2018 | Lu et al. |
| 2018/0144208 A1 | 5/2018 | Lu et al. |
| 2018/0144248 A1 | 5/2018 | Lu et al. |
| 2018/0268287 A1 | 9/2018 | Johansen et al. |
| 2018/0268298 A1 | 9/2018 | Johansen et al. |
| 2018/0285682 A1 | 10/2018 | Najibikohnehshahri et al. |
| 2018/0300400 A1 | 10/2018 | Paulus |
| 2018/0357554 A1 | 12/2018 | Hazan et al. |
| 2019/0108432 A1 | 4/2019 | Lu et al. |
| 2019/0108439 A1 | 4/2019 | Lu et al. |
| 2019/0130206 A1 | 5/2019 | Trott et al. |
| 2019/0130248 A1 | 5/2019 | Zhong et al. |
| 2019/0130273 A1 | 5/2019 | Keskar et al. |
| 2019/0130896 A1 | 5/2019 | Zhou et al. |
| 2019/0130897 A1 | 5/2019 | Zhou et al. |
| 2019/0149834 A1 | 5/2019 | Zhou et al. |
| 2019/0236482 A1 | 8/2019 | Desjardins et al. |
| 2020/0090048 A1 | 3/2020 | Pascanu et al. |

OTHER PUBLICATIONS

Amodei et al., "Deep Speech 2: End-to-End Speech Recognition in English and Mandarin," Published as a Conference Paper at the 33rd International Conference on Machine Learning. New York, NY. Jun. 19-24, 2016. pp. 1-28.
Anderson et al., "Bottom-Up and Top-Down Attention for Image Captioning and VQA," Conference on Computer Vision and Pattern Recognition 2018 full oral, Winner of the 2017 Visual Question Answering challenge. Honolulu, HI. Jul. 21-26, 2017. pp. 1-15.
Andreas et al., "The Option-Critic Architecture," Proceedings of the 34th International Conference on Machine Learning Sydney, Australia. Aug. 6-11, 2017. pp. 1-11.
Ba et al., "Layer Normalization," arXiv:1607.0645. 2016. https://arxiv.org/pdf/1607.06450.pdf. pp. 1-14.
Bacon et al., "The Option-Critic Architecture," Proceedings of the 31st Conference on the Association for the Advancement of Artificial Intelligence. San Francisco, California. Feb. 4-9, 2017. pp. 1-9.
Bahdanau et al., "An Actor-Critic Algorithm for Sequence Prediction," Published as a conference paper at the International Conference on Learning Representation. Toulon, France. Apr. 24-26, 2017. pp. 1-17.
Bahdanau et al., "End-to-End Attention-Based Large Vocabulary Speech Recognition," In International Conference an Acoustics, Speech and Signal Processing, IEEE. Lujiazui, Shanghai. Mar. 20-25, 2016. pp. 1-8.

Baum et al., "Statistical Inference for Probabilistic Functions of Finite State Markov Chains," The Annals of Mathmatical Statistics, vol. 37, Issue 6. Princeton, NJ. 1966. pp. 1-10.
Bengio et al., "Deep Learning of Representations for Unsupervised and Transfer Learning," In Journal of Machine Learning Research: Workshop on Unsupervised and Transfer Learning. 2012. pp 1-21.
Brown et al., "The Mathematics of Statistical Machine Translation: Parameter Estimation," Association for Computational Linguistics, vol. 19, No. 2. MIT—Massachusetts Institute of Technology. Jun. 1, 1993. pp. 1-50.
Chaplot et al., "Gated-Attention Architectures for Task-Oriented Language Grounding," The Association for the Advancement of Artificial Intelligence New Orleans, Louisiana. Feb. 2-7, 2018 pp. 1-11.
Chaubard et al., "CS 224D: Deep Learning for NLP, Lecture Notes: Part 1," Spring 2015. https://cs224d.stanford.edu/lecture_notes/LectureNotes1.pdf. pp. 1-11.
Chaubard et al., "CS 224D: Deep Learning for NLP, Lecture Notes: Part 2," Spring 2015. https://cs224d.stanford.edu/lecture_notes/LectureNotes2.pdf. pp. 1-11.
Chaubard et al., "CS 224D: Deep Learning for NLP, Lecture Notes: Part 3," Spring 2015. https://cs224d.stanford.edu/lecture_notes/LectureNotes3.pdf. pp. 1-11.
Chaubard et al., "CS 224D: Deep Learning for NLP, Lecture Notes: Part 4," Spring 2015. https://cs224d.stanford.edu/lecture_notes/LectureNotes4.pdf. pp. 1-12.
Chaubard et al., "CS 224D: Deep Learning for NLP, Lecture Notes: Part 5," Spring 2015. https://cs224d.stanford.edu/lecture_notes/LectureNotes5.pdf. pp. 1-6.
Cho et al., "On the Properties of Neural Machine Translation: Encoder-Decoder Approaches," Proceedings of the Syntax, Semantics and Structure in Statistical Translation (SSST-8), Eighth Workshop. Doha, Qatar. Oct. 25, 2014 pp. 1-9.
Chollet et al., "Xception: Deep Learning with Depthwise Separable Convolutions," Conference: 2017 IEEE Conference on Computer Vision and Pattern. Honolulu, HI. Jul. 21-26, 2017. pp. 1-8.
Chorowski et al., "Towards Better Decoding and Language Model Integration in Sequence to Sequence Models," Interspeech 2017, Situated Interaction. Stockholm, Sweden. Aug. 20-24, 2017. pp. 1-6.
Collobert et al., "Wav2Letter: an End-to-End ConvNet-based Speech Recognition System," Under review as a Conference Paper at the International Conference on Learning Representation. Toulon, France. Apr. 24-26, 2017. pp. 1-8.
Dai et al., "R-FCN: Object Detection via Region-Based Fully Convolutional Networks," 30th Conference on Neural Information Processing Systems (NIPS 2016), Barcelona, Spain. Dec. 5-10, 2016. pp. 1-11.
Fan et al., "Deep Learning for Audio," 2017. Slide Show, http://slazebni.cs.illinois.edu/spring17/lec26_audio.pdf. pp. 1-101.
Gal et al., "A Theoretically Grounded Application of Dropout in Recurrent Neural Networks," 30th Conference on Neural Information Processing Systems (NIPS 2016). Barcelona, Spain. Dec. 5-10, 2016. pp. 1-9.
Goodfellow et al., "Convolutional Networks," Lecture Slides for Chapter 9 of Deep Learning. MIT—Massachusetts Institute of Technology. Sep. 12, 2016. http://www.deeplearningbook.org/slides/09_conv.pdf. pp. 1-27.
Goyal et al., "Making the V in VQA Matter: Elevating the Role of Image Understanding in Visual Question Answering," eprint asXiv:1612.00837. https://arxiv.org/pdf/1612.00837.pdf. Dec. 2016. pp. 1-11.
Graves et al., "Connectionist Temporal Classification: Labelling Unsegmented Sequence Data with Recurrent Neural Networks," Appearing in Proceedings of the 23rd International Conference on Machine Learning. Pittsburgh, PA. Jun. 25-29, 2006. pp. 1-8.
Graves et al., "Towards End-to-End Speech Recognition with Recurrent Neural Networks," Proceedings of the 31st International Conference on Machine Learning, vol. 32. Beijing, China. Jun. 21-26, 2014. pp 1-9.
Hannun et al., "First-Pass Large Vocabulary Continuous Speech Recognition Using Bi-Directional Recurrent DNNs," arXiv preprint arXiv:1408.2873, 2014. https://arxiv.org/pdf/1408.2873.pdf. pp. 1-7.

(56) References Cited

OTHER PUBLICATIONS

Hashimoto et al., "A Joint Many-Task Model: Growing a Neural Network for Multiple NLP Tasks," Proceedings of the 2017 Conference on Empirical Methods in Natural Language Processing: Association for Computational Liguistics. Copenhagen, Denmark. Sep. 7-11, 2017. pp. 1-11.
He et al., "Deep Residual Learning for Image Recognition," Conference on Computer Vision and Pattern Recognition. Las Vegas Valley, NV Jun. 26-Jul. 1, 2016. pp. 1-12.
He et al., "Delving Deep into Rectifiers: Surpassing Human-Level Performance on ImageNet Classification," Proceedings of the IEEE International Conference on Computer Vision. Washington, DC. Dec. 7-13, 2015. pp. 1-11.
Hermann et al., "Grounded Language Learning in a Simulated 3D World," Deep Mind. London, UK. 2017. arXiv preprint arXiv:1706.0723. pp. 1-22.
Hinton et al., "Deep Neural Networks for Acoustic Modeling in Speech Recognition," IEEE Signal Processing Magazine, vol. 29, No. 6. 2012. pp. 1-27.
Ioffe et al., "Batch Normalization: Acceleration Deep Network Training by Reducing Internal Covariate Shift," Proceedings of the 32nd International Conference on Machine Learning, JMLR: W&CP, vol. 37. Mar. 2, 2015. pp. 1-9.
Johnson et al., "The Malmo Platform for Artificial Intelligence Experimentation," Proceedings of the 25th International Joint Conference on Artificial Intelligence. New York. City, New York. Jul. 9-15, 2016. pp. 1-2.
Kempka et al., "ViZDoom: A Doom-based AI Research Platform for Visual Reinforced Learning," Proceedings of IEEE Conference of Computational Intelligence in Games 2016. Sep. 20-23, 2016. pp. 1-8.
Krishna et al., "Visual Genome: Connecting Language and Vision Using Crowdsourced Dense Image Annotations," Published 2016 in International Journal of Computer Vision. Feb. 23, 2016. pp. 1-44.
Kulkarni et al., "Hierarchical Deep Reinforcement Learning: Integrating Temporal Abstraction and Intrinsic Motivation," In Advances in Neural Information Processing Systems (NIPS). Barcelona, Spain. Dec. 5-10, 2016. pp. 1-14.
Levine et al., "End-to-End Training of Deep Visuomotor Policies," Journal of Machine Learning Research, vol. 17, No. 39. Berkeley, CA. 2016 pp. 1-40.
Levine et al., "Learning Hand-Eye Coordination for Robotic Grasping with Deep Learning and Large-Scale Data Collection," The 2016 International Symposium on Experimental Robotics (ISER 2016). Tokyo, Japan. Oct. 3-6, 2016. pp. 1-12.
Li, "Deep Reinforcement Learning: A Overview," Proceedings of SAI Intelligent Systems Conference (IntelliSys). London, United Kingdom. Sep. 21-22, 2016. pp. 1-70.
Lin et al., "A Structured Self-Attentive Sentence Embedding," Published as a Conference Paper at the International Conference on Learning Representation. Toulon, France. Apr. 24-26, 2017. pp. 1-15.
Luo et al., "Learning Online Alignments with Continuous Rewards Policy Gradient," 29th Conference on Neural Information Processing Systems (NIPS 2016). Barcelona, Spain. Dec. 5-10, 2016. pp. 1-9.
Miao et al., "EESEN: End-to-End Speech Recognition Using Deep RNN Models and WFST-Based Decoding," In 2015 IEEE Workshop on Automatic Speech Recognition and Understanding (ASRU). Scottsdale, AZ. Dec. 13-17, 2015. pp. 1-8.
Mirowski et al., "Learning to Navigate in Complex Environments," Under Review as a Conference Paper at the International Conference on Learning Representation. Toulon, France . Apr. 24-26, 2017. pp. 1-9.
Mnih et al., "Asynchronous Methods for Deep Reinforcement Learning," Proceedings of the 33rd International Conference on Machine Learning, JMLR: W&CP, vol. 48. New York, NY. Jun. 19-24, 2017. pp. 1-19.
Mnih et al., "Human-Level Control Through Deep Reinforcement Learning," Google DeepMind, vol. 518, Nature 529. London, UK. Feb. 26, 2015. pp. 1-13.
Narasimhan et al., "Language Understanding for Text-Based Games Using Deep Reinforcement Learning," Proceedings of the Conference on Empirical Methods in Natural Language Processing. Lisbon, Portugal. Sep. 17-21, 2015. pp. 1-11.
Panayotov et al., "Librispeech: An ASR Corpus Based on Public Domain Audio Books," In 2015 IEEE International Conference on Acoustics, Speech and Signal Processing (ICASSP). Brisbane, QLD, Australia. Apr. 19-24, 2015. pp. 1-5.
Parisotto et al., "Actor-Mimic Deep Multitask and Transfer Reinforcement Learning," Published as a Conference Paper at the International Conference on Learning Representation. San Juan, Puerto Rico. May 2-4, 2016. pp. 1-16.
Inan et al., "Tying Word Vectors and Word Classifiers: A Loss Framework for Language Modeling," published as a conference paper at ICLR 2017, arXiv:1611.01462v3, Mar. 11, 2017, pp. 1-13.
Sennrich et al., "Neural Machine Translation of Rare Words with Subword Units," arXiv:1508.07909v5, 2016, pp. 1-11.
Graves et al., "Towards End-to-End Speech Recognition with Recurrent Neural Networks," Proceedings of the 31st Conference on Machine Learning, Beijing, China. Jun. 21, 2014. pp. 1-9.
Lu et al., "Multitask Learning with CTC and Segmental CRF for Speech Recognition," Interspeech 2017. Stockholm, Sweden. Aug. 20-24, 2017. pp. 1-5.
Luo et al., "Learning Online Alignments with Continuous Rewards Policy Gradient," 29th Conference on Neural Information Processing Systems. Barcelona, Spain. Dec. 5-10, 2016. pp. 1-9.
Norouzi et al., "Reward Augmented Maximum Likelihood for Neural Structured Prediction," Conference on Neural Information Processing Systems. Barcelona, Spain. Dec. 5-10, 2016. pp. 1-11.
Zhou et al., "Improving End-to-End Speech Recognition with Policy Learning," IEEE International Conference on Acoustics, Speech and Signal Processing New Orleans, Louisiana. Mar. 5-9, 2017. pp. 1-5.
International Search Report and Written Opinion issued by the International Searching Authority dated Jan. 15, 2019 for PCT App. No. PCT/US2018/057446. pp. 1-18.
Pascanu et al., "On the Difficulty of Training Recurrent Neural Networks." Proceedings of the 30th International Conference on Machine Learning (ICML). Atlanta, Georgia. Jun. 16-21, 2013. pp. 1-9.
Paulus et al., "A Deep Reinforced Model for Abstractive Summarization," Published as a Conference Paper at the International Conference on Learning Representation Vancouver, Canada. Apr. 30-May 3, 2018. pp. 1-12.
Pinto et al., "Supersizing Self-Supervision: Learning to Grasp from 50K Tries and 700 Robot hours," Published in: 2016 IEEE International Conference on Robotics and Automation (ICRA). Stockholm, Sweden. May 16-21, 2016. pp. 1-8.
Pirsiavash et al., "Parsing Videos of Actions with Segmental Grammars," 2014 IEEE Conference on Computer Vision and Pattern Recognition. Columbus, OH. Jun. 23-28, 2014. pp. 1-8.
Ranzato et al., "Sequence Level Training With Recurrent Neural Networks," Published as a Conference Paper at International Conference on Learning Representations (ICLR). San Juan, Puerto Rico. May 2-4, 2016. pp. 1-16.
Rennie et al., "Self-Critical Sequence Training for Image Captioning," Conference on Computer Vision and Pattern Recognition. Las Vegas Valley, NV. Jun. 26-Jul. 1, 2016. pp. 1-16.
Rusu et al., "Policy Distillation," Under Review as a Conference Paper at the International Conference on Learning Representation. San Juan, Puerto Rico. May 2-4, 2016. pp. 1-13.
Saon et al., "The IBM 2015 English Conversational Telephone Speech Recognition System," Submitted to Interspeech, The 42nd International Symposium on Computer Architecture. Portland, Oregon. Jun. 13-17, 2015. pp. 1-5.
Shazeer et al., "Outrageously Large Neural Networks: The Sparsely-Gated Mixture-of-Experts Layer," Under Review as a Conference Paper at the International Conference on Learning Representation. Toulon, France. Apr. 24-26, 2017. pp. 1-19.

(56) References Cited

OTHER PUBLICATIONS

Si et al., "Unsupervised Learning of Event AND-OR Grammar and Semantics from Video," 2011 International Conference on Computer Vision Barcelona, Spain. Nov. 6-13, 2011. pp. 1-8.
Sifre et al., "Rotation, Scaling and Deformation Invariant Scattering for Texture Discrimination," Accepted at 2013 IEEE Conference on Computer Vision and Pattern Recognition. Portland, Oregon. Jun. 23-27, 2013. pp 1-8.
Silver et al., "Mastering the Game of Go with Deep Neural Networks and Tree Search," Nature, 529(7587):484-487, Jan. 2016. doi: 10.1038/nature16961. https://deepmind.com/documents/119/agz_unformatted_nature.pdf. pp. 1-37.
Silver et al., "Mastering the Game of Go Without Human Knowledge," DeepMind, Nature, 550. London, UK. 2017. https://deepmind.com/documents/119/agz_unformatted_nature.pdf. pp. 1-42.
Srivastava et al., "Dropout: A Simple Way to Prevent Neural Networks from Overfitting," Journal of Machine Learning Research, vol. 15, No. 1. University of Toronto. Jun. 14, 2014. pp. 1-30.
Su et al., "Sample-Efficient Actor-Critic Reinforcement Learning with Supervised Data for Dialogue Management," The 18th Annual SIGdial Meeting on Discourse and Dialogue (SIGDIAL). Saarbrücken, Germany. Aug. 15-17, 2017. pp. 1-11.
Sutton et al., "Between MDPs and Semi-MDPs: A Framework for Temporal Abstraction in Reinforcement Learning," Artificial Intelligence, vol. 112, Issues 1-2. Essex, UK. Aug. 1999. pp. 1-31.
Teh et al., "Distral: Robust Multitask Reinforcement Learning," In International Conference on Learning Representations. Toulon, France. Apr. 24-26, 2017. pp. 1-13.
Teney et al., "Graph-Structured Representations for Visual Question Answering," 2017 IEEE Conference on Computer Vision and Pattern Recognition (CVPR) Honolulu, HI. Jul. 21-26, 2017. pp. 1-17.
Tessler et al., "A Deep Hierarchical Approach to Lifelong Learning in Minecraft," Proceedings of the 31st Conference on Artificial Intelligence. San Francisco, California. Feb. 4-10, 2017. pp. 1-9.
Tieleman et al. "Lecture 6.5-RMSProp: Divide the gradient by a running average of its recent magnitude," COURSERA: Neural Networks for Machine Learning. Jan. 1, 2012. pp. 1-4.
Van Den Oord et al., "Conditional Image Generation with PixelCNN Decoders," 30th Conference on Neural Information Processing Systems (NIPS 2016). Barcelona, Spain. Dec. 5-10, 2016. pp. 1-9.
Vaswani et al., "Attention is All You Need," 31st Conference on Neural Information Processing Systems (NIPS 2017). Long Beach, CA. Dec. 4-9, 2017. pp. 1-15.
Vezhnevets et al., "Strategic Attentive Writer for Learning Macro-Actions," 29th Conference on Neural Information Processing Systems (NIPS 2016). Barcelona, Spain. Dec. 5-10, 2016. pp. 1-10.
Wang et al., "Sample Efficient Actor-Critic with Experience Replay," Published as a Conference Paper at the International Conference on Learning Representation. Toulon, France. Apr. 24-26, 2017. pp. 1-20.
Williams, "Simple Statistical Gradient-Following Algorithms for Connectionist Reinforcement Learning," Appears in Proceedings of the 9th International Workshop on Machine Learning (M92), vol. 8, Issue 3-4. May 1992. pp. 1-27.
Wu et al., "Introduction to Convolutional Neural Networks," National Key Lab for Novel Software Technology. Nanjing University, China. May 1, 2017. pp. 1-31.
Wu et al., "On Multiplicative Integration with Recurrent Neural Networks," 30th Conference on Advances in Neural Information Processing Systems (NIPS). Barcelona, Spain. Dec. 5-10, 2016. pp. 1-10.
Xiong et al., "Dynamic Coattention Networks for Question Answering," Published as a Conference Paper at the International Conference on Learning Representations. Toulon, France. Apr. 24-26, 2017. pp. 1-14.
Xiong et al., "The Microsoft 2016 Conversational Speech Recognition System," In Acoustics, Speech and Signal Processing (ICASSP), International Conference on IEEE. New Orleans, Louisiana. Mar. 5-9, 2017. pp. 1-5.

* cited by examiner

- If $t = 0$, $$e_0 \sim \pi_k^{spv\prime}(e_0|s_t, g) \propto \pi_k^{spv}(e_0|s_t, g) \sum_{g^\prime \in \mathcal{G}_{k-1}} q_k(e_0, g^\prime|g),$$

$$g_0^\prime \sim \pi_k^{inst\prime}(g_0^\prime|s_t, g) \propto \pi_k^{inst}(g_0^\prime|s_t, g) q_k(e_0 = 0, g_0^\prime|g);$$

- Otherwise, $$e_t \sim \pi_k^{spv\prime}(e_t|e_{t-1}, g_{t-1}^\prime, s_t, g) \propto \pi_k^{spv}(e_t|e_{t-1}, g_{t-1}^\prime, s_t, g) \sum_{g^\prime \in \mathcal{G}_{k-1}} p_k(e_t, g^\prime|e_{t-1}, g_{t-1}^\prime, g),$$

$$g_t^\prime \sim \pi_k^{inst\prime}(g_t^\prime|e_{t-1}, g_{t-1}^\prime, s_t, g) \propto \pi_k^{inst}(g_t^\prime|s_t, g) p_k(e_t = 0, g_t^\prime|e_{t-1}, g_{t-1}^\prime, g).$$

Algorithm 1 RUN($k, g$)

Input: Policy level $k$, task $g \in \mathcal{G}_b$
Output: Episode trajectory $\Gamma$ at the top level policy 1: $t \leftarrow 0$
2: $\Gamma = \emptyset$
3: Get initial state $s_0$
4: repeat
5:   if $k == 1$ then
6:     Sample $a_t \sim \pi_k(\cdot|s_t, g)$ and execute $a_t$
7:     Get current state $s_{t+1}$
8:     $r_t \leftarrow R(s_{t+1}, g)$
9:     Add $(s_t, a_t, r_t, \pi_k(\cdot|s_t, g), g)$ to $\Gamma$
10:   else
11:     Sample $e_t$ and $g_t^i$ as in Section 3.3 for using STG as guidance
12:     Sample $a_t \sim \pi_k^{\text{adv}}(\cdot|s_t, g)$
13:     if $e_t == 0$ then
14:       // Execute base policy $\pi_{k-1}$ by giving instruction $g_t^i$
15:       RUN($k-1, g_t^i$)
16:     else
17:       Execute $a_t$
18:     end if
19:     Get current state $s_{t+1}$
20:     $r_t \leftarrow R(s_{t+1}, g)$
21:     Add $(s_t, e_t, g_t^i, a_t, r_t, \pi_k^{\text{rw}}(\cdot|s_t), \pi_k^{\text{inst}}(\cdot|s_t, g), \pi_k^{\text{base}}(\cdot|s_t, g), g)$ to $\Gamma$
22:   end if
23:   $t \leftarrow t + 1$
24: until $t > T$ or $r_t \neq 0$

Algorithm 2 Learning global policy and STG at stage $k > 0$
1: Specify $\lambda$, maximum training iterations $N$, alternating update rotation frequency $M$, and reward threshold $R_{min}$
2: Initialize total replay memory $D \leftarrow \emptyset$ and its subset for positive episodes $D_+ \leftarrow \emptyset$
3: Initialize current iteration id $i \leftarrow 0$ and set current updating term to be $\tau \leftarrow 1$
4: Initialize parameters of policies and value functions $\Theta = \langle \theta^{\pi}, \theta^{\mu}, \theta^{\mu}_v, \theta^{\pi}_v, \theta^{\pi}_\phi \rangle$
5: Initialize distributions of the STG as uniform distributions
6: repeat
7:     Determine current learning phase by comparing average rewards of tasks in $G_{k-1}$ with $R_{min}$
8:     if in curriculum learning phase 1 then
9:         Sample a task $g$ from base task set $G_{k-1}$
10:    else
11:        Sample a task $g$ from global task set $G_k$
12:    end if
13:    //Run an episode
14:    $\Gamma \leftarrow \text{RUN}(k, g)$
15:    $D \leftarrow D \cup \Gamma$
16:    if the maximum reward in $\Gamma$ is $+1$ then
17:        $D_+ \leftarrow D_+ \cup \Gamma$
18:        Re-estimate the distributions of the STG based on updated $D_+$ by MLE
19:    end if
20:    Sample $n \sim \text{Poission}(\lambda)$
21:    for $j \in \{1, \ldots, n\}$ do
22:        Sample a mini-batch $S$ from $D$
23:        Update $\Theta$ based on (9) and the $\tau$-th term in (8)
24:        $i \leftarrow i + 1$
25:        if $i \% M == 0$ then
26:            $\tau \leftarrow \tau\%3 + 1$
27:        end if
28:    end for
29: until $i \geq N$

|   | Small room | | | Big room | | |
| --- | --- | --- | --- | --- | --- | --- |
| Method | Find x | Get x | Put x | Stack x | Find x | Get x | Put x | Stack x |
| Full model | 0.995 | 0.970 | 1.00 | 0.955 | 0.723 | 0.648 | 1.00 | 0.613 |
| Flat policy | 0.980 | 0.965 | 1.00 | - | 0.515 | 0.450 | 1.00 | - |

FIG. 7

(a) Learning curves for $\pi_1$.   (b) Learning phase 2 for $\pi_3$.

(a) Learning curves for $\pi_1$.   (b) Learning curves for $\pi_3$.

HIERARCHICAL AND INTERPRETABLE SKILL ACQUISITION IN MULTI-TASK REINFORCEMENT LEARNING

PRIORITY APPLICATIONS

This application claims the benefit of U.S. Provisional Application No. 62/578,377, entitled "HIERARCHICAL AND EXPLAINABLE SKILL ACQUISITION IN MULTI-TASK REINFORCEMENT LEARNING", filed Oct. 27, 2017. The priority application is incorporated by reference for all purposes as if fully set forth herein; and This application claims the benefit of U.S. Provisional Application No. 62/578,366, entitled "DEEP LEARNING-BASED NEURAL NETWORK, ARCHITECTURE, FRAMEWORKS AND ALGORITHMS", filed Oct. 27, 2017. The priority application is incorporated by reference for all purposes as if fully set forth herein.

FIELD OF THE TECHNOLOGY DISCLOSED

The technology disclosed relates generally to reinforcement learning, and more specifically to learning policies for complex tasks that require multiple different skills, and to efficient multi-task reinforcement learning through multiple training stages.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Deep reinforcement learning has demonstrated success in policy search for tasks in domains like game playing and robotic control. However, it is very difficult to accumulate multiple skills using just one policy network. Knowledge transfer techniques like distillation have been applied to train a policy network both to learn new skills while preserving previously learned skills as well as to combine single-task policies into a multi-task policy. Existing approaches usually treat all tasks independently. This often prevents full exploration of the underlying relations between different tasks. The existing approaches also typically assume that all policies share the same state space and action space. This assumption precludes transfer of previously learned simple skills to a new policy defined over a space with differing states or actions.

When humans learn new skills, we often take advantage of our existing skills and build new capacities by composing or combining simpler ones. For instance, learning multi-digit multiplication relies on the knowledge of single-digit multiplication; learning how to properly prepare individual ingredients facilitates cooking dishes based on complex recipes.

Inspired by this observation, the disclosed hierarchical policy network can reuse previously learned skills alongside and as subcomponents of new skills. It achieves this by discovering the underlying relations between skills.

The disclosed systems and methods do not assume that a global task can be executed by only performing predefined sub-tasks. For the disclosed multi-task reinforcement learning (RL) with multi-level policy, global tasks at a lower-level layer may also be used as sub-tasks by global tasks carried out at higher levels.

Complex policies often require the modeling of longer temporal dependencies than what standard Markov decisions processes (MDPs) can capture. Hierarchical RL introduces options, or macro options, on top of primitive actions to decompose the goal of a task into multiple subgoals. In hierarchical RL, two sets of policies are trained: local policies that map states to primitive actions for achieving subgoals, and a global policy that initiates suitable subgoals in a sequence to achieve the final goal of a task. This two-layer hierarchical policy design significantly improves the ability to discover complex policies which cannot be learned by flat policies. However, two-layer hierarchical policy design also makes some strict assumptions that limit its flexibility: a task's global policy cannot use a simpler task's policy as part of its base policies; and a global policy is assumed to be executable by only using local policies over specific options. It is desirable to not impose these two limiting assumptions.

An opportunity arises to train a software agent to employ hierarchical policies that decide when to use a previously learned skill and when to learn a new skill. This enables the agent to continually acquire new skills during different stages of training, reusing previously learned skills alongside and as subcomponents of new skills. Global tasks at a lower-level layer may also be used as sub-tasks by global tasks carried out at higher levels. The disclosed technology also includes encoding a task with a human instruction to learn task-oriented language grounding, as well as to improve the interpretability of plans composed by the disclosed hierarchical policies.

SUMMARY

A simplified summary is provided herein to help enable a basic or general understanding of various aspects of example, non-limiting implementations that follow in the more detailed description and the accompanying drawings. This summary is not intended, however, as an extensive or exhaustive overview. Instead, the sole purpose of the summary is to present some concepts related to some example non-limiting implementations in a simplified form as a prelude to the more detailed description of the various implementations that follow.

The disclosed technology reveals a hierarchical policy network, for use by a software agent running on a processor, to accomplish an objective that requires execution of multiple tasks, including a terminal policy learned by training the agent on a terminal task set, an intermediate policy learned by training the agent on an intermediate task set, and a top policy learned by training the agent on a top task set. The disclosed terminal policy serves as a base policy of the intermediate policy and the terminal task set serves as a base task set of the intermediate task set, and the intermediate policy serves as a base policy of the top policy and the intermediate task set serves as a base task set of the top task set. The disclosed agent is configurable to accomplish the objective by traversal of the hierarchical policy network, decomposition of one or more tasks in the top task set into tasks in the intermediate task set, and further decomposition of one or more tasks in the intermediate task set into tasks in the terminal task set. During the decomposition, a current task in a current task set is executed by executing a previously-learned task selected from a corresponding base task set governed by a corresponding base policy, or performing a primitive action selected from a library of primitive actions.

Other aspects and advantages of the technology disclosed can be seen on review of the drawings, the detailed description and the claims, which follow.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 4 shows equations for a stochastic temporal grammar model that uses history of switches and instructions in positive episodes to modulate when to use the previously learned task and when to discover the primitive action.

FIG. 5 shows a disclosed algorithm for composing a plan for a complex task based on simpler tasks which are specified by a human instruction.

FIG. 6 shows a learning algorithm for learning the final hierarchical policy through k stages of skill acquisition, in accordance with one or more implementations of the technology disclosed.

FIG. 7 shows success rates in different game environments.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Learning policies for complex tasks that require multiple different skills is a major challenge in reinforcement learning (RL). It is also a requirement for its deployment in real-world scenarios. In one example, disease treatment is a use case scenario for policy learning for complex tasks that require multiple different skills. In another real-world scenario, the learning of policies is utilized in gaming environments.

The disclosed novel framework for efficient multi-task reinforcement learning trains software agents to employ hierarchical policies that decide when to use a previously learned policy and when to learn a new skill. This enables agents to continually acquire new skills during different stages of training. Each learned task corresponds to a human language description. Because agents can only access previously learned skills through these descriptions, the agent can provide a human-interpretable description of its choices. In order to help the agent learn the complex temporal dependencies necessary for the hierarchical policy, the disclosed technology provides it with a stochastic temporal grammar that modulates when to rely on previously learned skills and when to execute new skills. A disclosed hierarchical policy network which can reuse previously learned skills alongside and as subcomponents of new skills is described next.

Hierarchical Task Processing System

Figure 1:
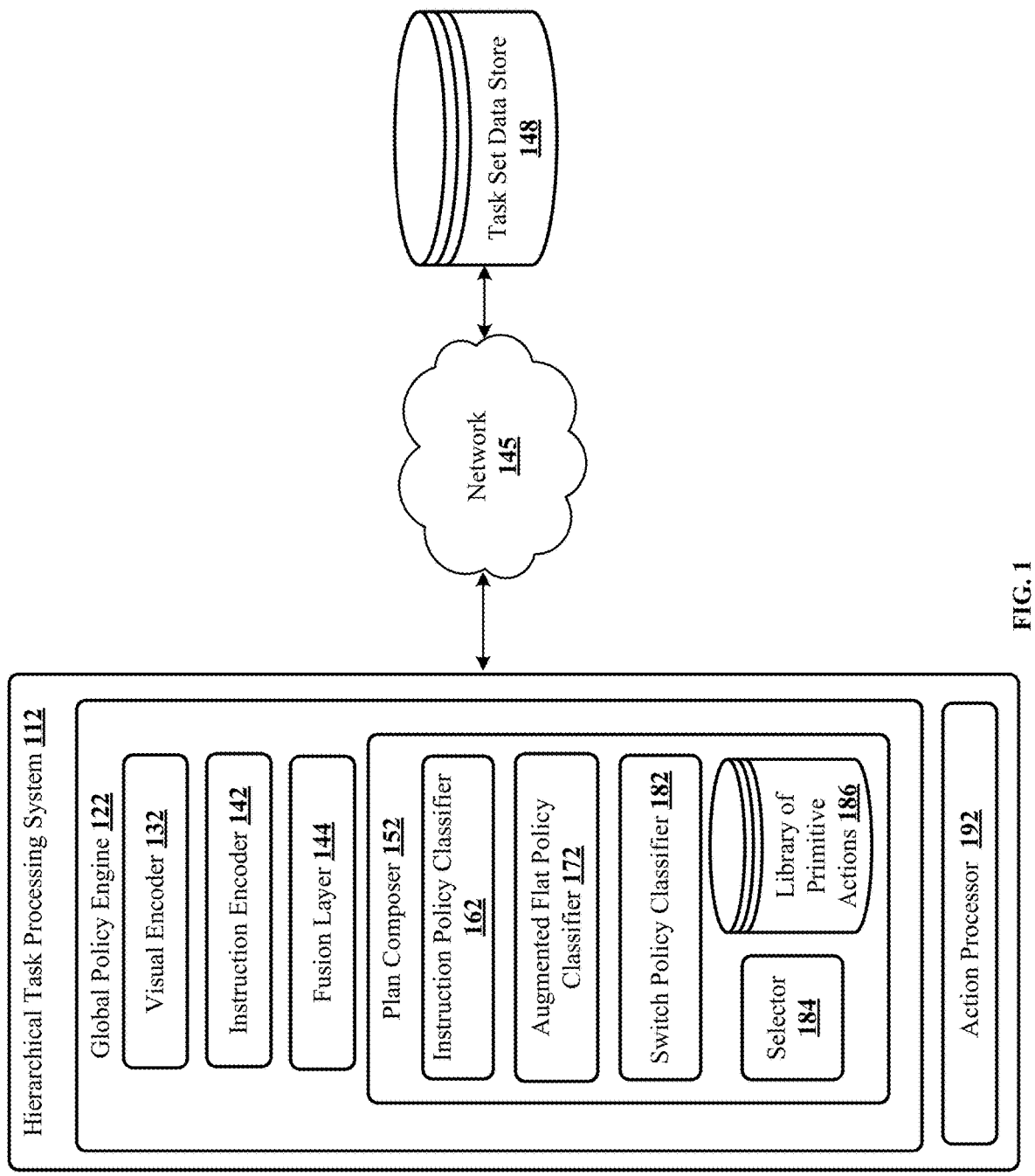
FIG. 1 depicts various aspects of a hierarchical task processing system for use by an agent to accomplish an objective that requires execution of multiple tasks, according to one implementation of the technology disclosed.

FIG. 1 shows architecture 100 of a hierarchical task processing system for use by an agent to accomplish an objective that requires execution of multiple tasks. Hierarchical task processing system 112 includes a global policy engine 122 that learns the language grounding for both visual knowledge and policies. Global policy engine 122 includes visual encoder 132 to encode an image into a visual representation, instruction encoder 142 to encode a natural language instruction into a bag-of-words (BOW) representation, and fusion layer 144 that concatenates the representation of the image and the encoded natural language instruction. As used in the disclosed technology, the BOW vector space representation simplifies the representation of the input human instruction text, including disregarding grammar and word order.

Continuing with the description of architecture 100 in FIG. 1, global policy engine 122 also includes plan composer 152 for composing plans for complex tasks based on simpler ones which have human descriptions. Plan composer 152 includes instruction policy classifier 162 that manages communication between global policy and base policy, augmented flat policy classifier 172 which allows the global policy to directly execute actions, and switch policy classifier 182 that decides whether the global policy will primarily rely on the base policy or the augmented flat policy. Plan composer 152 also includes selector 184 that selects a primitive action from library of primitive actions 186 which include turn left, turn right, pick up, put down and move forward primitive actions, in one implementation. Additionally, hierarchical task processing system 112 includes action processor 192 that, based on the switch policy classifier's determination, implements one or more primitive actions of the selected previously-learned task or the selected primitive action. Architecture 100 also includes task set data store 148 with tasks sets G in which each task g is uniquely described by a human instruction. In the present discussion, tasks and instructions are treated as interchangeable concepts.

Further continuing the description of FIG. 1, architecture 100 also includes network 145 that interconnects the elements of architecture 100, hierarchical task processing system 112 and task set data store 148, in communication with each other.

The actual communication path can be point-to-point over public and/or private networks. Some items, such as data from data sources, might be delivered indirectly, e.g. via an application store (not shown). The communications can occur over a variety of networks, e.g. private networks, VPN, MPLS circuit, or Internet, and can use appropriate APIs and data interchange formats, e.g. REST, JSON, XML, SOAP and/or JMS. The communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. Additionally, a variety of authorization and authentication techniques, such as username/password, OAuth, Kerberos, Secure ID, digital certificates and more, can be used to secure the communications. In some implementations, the elements or components of architecture 100 can be engines of varying types including workstations, servers, computing clusters, blade servers, server farms, or any other data processing systems or computing devices. The elements or components can be communicably coupled to the databases via a different network connection.

Conceptually, reinforcement learning includes teaching a software agent how to behave in an environment by telling it how well it is doing. The reinforcement learning system includes a policy, a reward function, and a value function. A policy tells the agent what to do in a certain situation. A reward function defines the goal for an agent. It takes in a state, or a state and the action taken at that state, and gives back a number called the reward, which tells the agent how good it is to be in that state. The agent's job is to get the biggest amount of reward it possibly can in the long run. If an action yields a low reward, the agent will probably take a better action in the future. As an example, biology uses reward signals like pleasure or pain to make sure organisms stay alive to reproduce. Reward signals can also be stochastic, like a slot machine at a casino, where sometimes they pay and sometimes they do not. A value function tells an agent how much reward it will get following a specific policy starting from a specific state. It represents how desirable it is to be in a certain state. Since the value function isn't given to the agent directly, it needs to come up with a good estimate based on the reward it has received so far. The agent's mental copy of the environment is used to plan future actions. For a reinforcement learning episode, the agent interacts with the environment in discrete time steps. At each time, the agent observes the environment's state and picks an action based on a policy. The next time step, the agent receives a reward signal and a new observation. The value function is updated using the reward. This continues until a terminal state is reached. Global policy engine 122 is described next.

Global Policy Engine

Figure 2A:
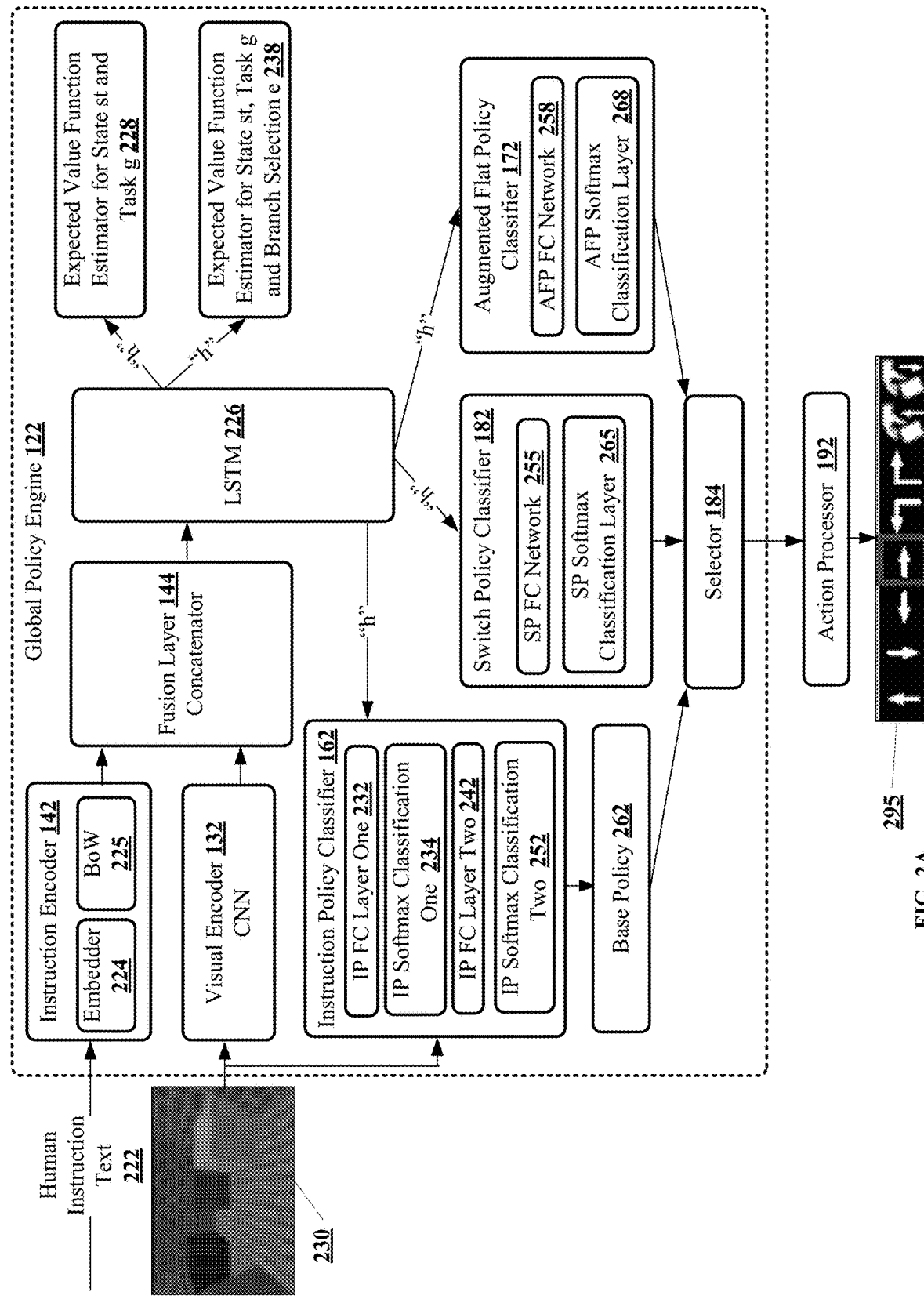
FIG. 2A shows a block diagram for the global policy engine of the hierarchical task processing system of FIG. 1.

FIG. 2A shows a block diagram for disclosed global policy engine 122 for a current task set $g_k$ at a training stage k. Global policy engine 122 includes instruction encoder 142, visual encoder 132, fusion layer concatenator 144, and LSTM 226. Global policy engine 122 also includes value function estimators: expected value function estimator for state s and task g, V(s, g) 228, and expected value function estimator for states, task g and branch selection e, $V^{SW}$(s, e, g) 238, each of which have a scalar output through a fully-connected (FC) layer. The hierarchical design includes four sub-policies: base policy 262 for executing previously learned tasks, instruction policy classifier 162 that manages communication between the global policy and base policy 262, augmented flat policy (AFP) classifier 172 which allows the global policy to directly execute actions, and switch policy (SP) classifier 182 that decides whether the global policy will primarily rely on base policy 262 or on augmented flat policy. Selector 184 selects the action sampled from augmented flat policy classifier 172 or base policy 262 based on the switching decision sampled from switch policy classifier 182.

Continuing with the description of FIG. 2A, instruction encoder 142 includes an embedding network 224 and a BOW network 225. Instruction encoder 142 encodes natural language instruction text 222 that specifies the current task, also referred to as an instruction, into one embedded vector per word, and combines the embedded vectors into a BOW representation. In one implementation, instruction encoder 142 first embeds each word in a natural language instruction text 222 into a 128-dim vector and combines them into a single vector by BOW. Thus, the output is a 128-dim vector.

Visual encoder 132 utilizes a convolutional neural network (CNN) trained to extract feature maps from an image 230 of an environment view of the agent, and encode the features maps in a visual representation. In one implementation, visual encoder 132 extracts feature maps from an input RGB frame with the size of 84×84 through three convolutional layers. The first layer has 32 filters with kernel size of 8×8 and stride of 4. The second layer has 64 filters with kernel size of 4×4 and stride of 2, and the last layer includes 64 filters with kernel size of 3×3 and stride of 1. The feature maps are flattened into a 3136-dim vector and the dimension of this vector is reduced to 256 by a fully-connected (FC) layer, resulting in a 256-dim visual feature as the final output.

Further continuing with the description of FIG. 2A, fusion layer concatenator 144 concatenates the encoded visual representation and the BOW language representation and outputs a 384-dim fused representation to a long short-term memory (LSTM) network 226 which includes 256 hidden units. LSTM 226 is trained to process the fused representation and output a hidden representation. The hidden layer output "h" of the LSTM is served as the input of the policy modules and value function modules. In another implementation of the disclosed hierarchical policy network, the dimensions of the vectors could be different.

Continuing with the description of FIG. 2A, switch policy (SP) classifier 182 is trained to process the hidden representation and determine whether to execute the current task by executing the previously-learned task or by performing the primitive action. Switch policy (SP) classifier 182 has a SP fully-connected (FC) network 255 with output dimension of two and SP softmax classification layer 265 to get policy at stage k: $\pi_k^{SW}(e|s, g)$.

Human-Interpretable Skill Acquisition

Instruction policy (IP) classifier 162 is trained to process the hidden representation, when switch policy classifier 182 determines that the current task is to be executed by executing the previously-learned task, and select the previously-learned task from the corresponding base task set, and emit a natural language description of the selected previously-learned task. Instruction policy classifier 162 has two separate fully-connected (FC) layers: IP FC layer one 232, which is activated by IP softmax activation one 234, and IP FC layer two 242, which is activated by IP softmax activation two 252, to output the distribution of skill, $p_k^{skill}(u_{skill}|s, g)$ and the distribution of item, $p_k^{item}(u_{item}|s, g)$, respectively.

Figure 2B:
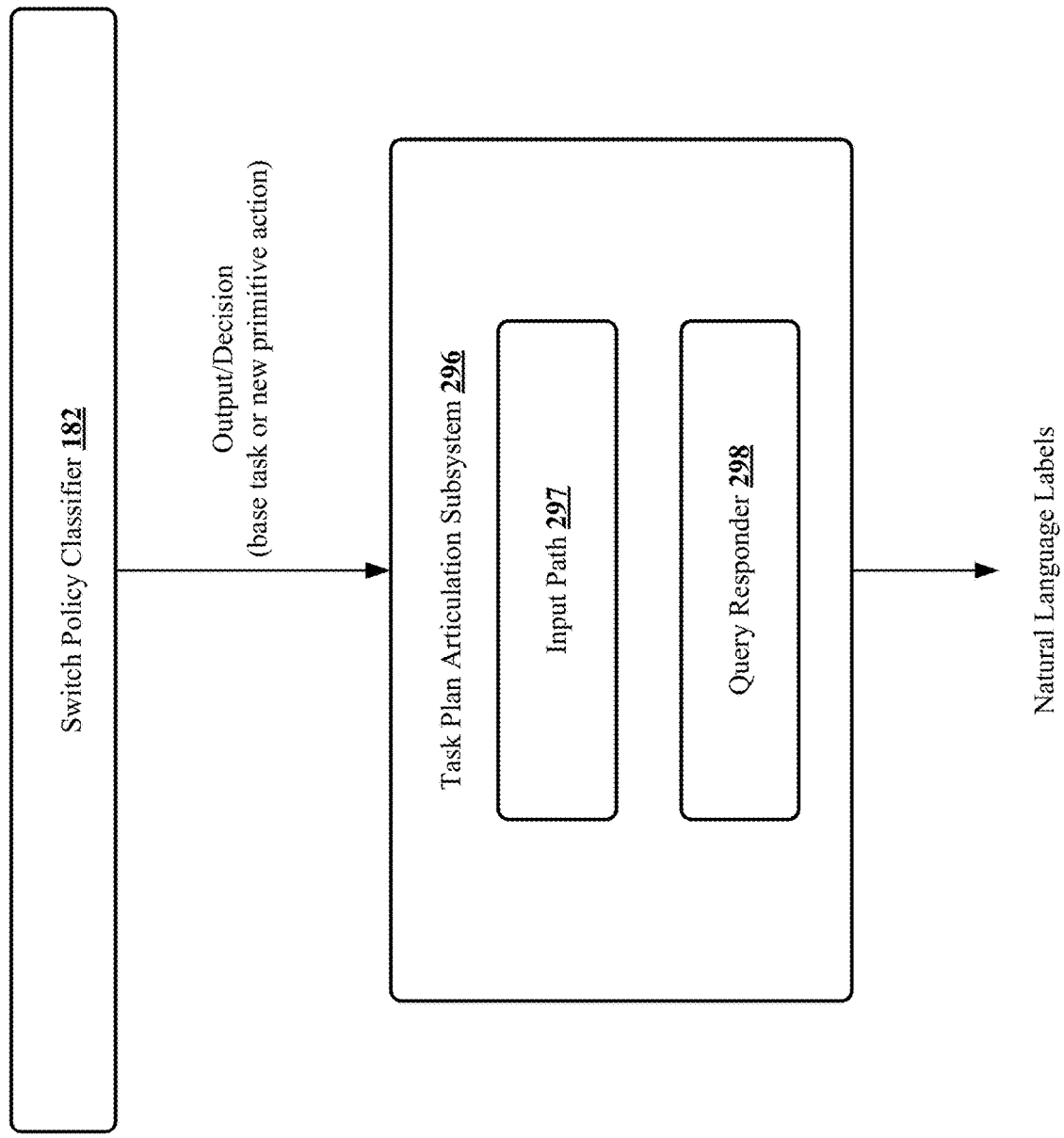
FIG. 2B illustrates one implementation of a task plan articulation subsystem that articulates a plan formulated by the hierarchical task processing system of FIG. 1.

FIG. 2B illustrates one implementation of a task plan articulation subsystem 296 that articulates a plan formulated by the hierarchical task processing system of FIG. 1. The task plan articulation subsystem 296 comprises an input path 297. The input path 297 receives a selected output (e.g., a decision from the switch policy classifier 182) that indicates whether to use a previously learned task or to apply an augmented flat policy to discover a primitive action in order to respond to a natural language instruction that specifies an objective that requires execution of multiple tasks to accomplish. The previously learned tasks are arranged in a hierarchy comprising top tasks, intermediate tasks, and terminal tasks (discussed in more detail below in the section titled "Hierarchical Policy Network"). Each previously learned task in the hierarchy has a natural language label applied to the task and to a branch node under which the task is organized. A newly discovered primitive action receives a natural language label applied to the newly discovered primitive action and to a branch node under which the newly discovered primitive action is organized.

The task plan articulation subsystem also comprises a query responder 298. The query responder 298 receives a request for a plan of execution and articulates the natural language labels for the branch node and the tasks and primitive actions under the branch node of the selected output as a plan for consideration and approval or rejection.

New Skill Acquisition

Augmented flat policy (AFP) classifier 172 is trained to process the hidden representation when switch policy classifier 182 determines that the current task is to be executed by performing the primitive action, and select the primitive action from the library of primitive actions. Augmented flat policy classifier 172 outputs $\pi_{aug}(a|s, g)$ through AFP FC network 258 and AFP softmax activation layer 268. Action processor 192 implements one or more primitive actions 295 of the selected previously-learned task or the selected primitive action, based on the determination of switch policy classifier 182.

Hierarchical Policy Network

Reinforcement learning (e.g., the REINFORCE algorithm) is used to train the agent on a progression of task sets, beginning with a terminal task set and continuing with an intermediate task set and with a top task set, according to one implementation. The terminal task set is formulated by selecting a set of primitive actions from a library of primitive actions. The intermediate task set is formulated by making available the formulated terminal task set as the base task set of the intermediate task set. The top task set is formulated by making available the formulated intermediate task set as the base task set of the top task set. The task complexity can increase from the terminal task set to the intermediate task set and the top task set, according to one implementation.

Accordingly, a terminal policy is defined as a reinforcement learning-based policy learned by the agent with the objective of maximizing a reward when performing tasks from the terminal task set. An intermediate policy is defined as a reinforcement learning-based policy learned by the agent with the objective of maximizing a reward when performing tasks from the intermediate task set which is in turn formulated from the terminal task set. A top policy is defined as a reinforcement learning-based policy learned by the agent with the objective of maximizing a reward when performing tasks from the top task set which is in turn formulated from the intermediate task set.

Consider for example a two room game environment in the so-called Minecraft game. The environment comprises an arbitrary number of blocks with different colors randomly placed in one of the two rooms. The agent is initially placed in the same room with the items. Now consider four sets of tasks: (i) terminal task "Find x" with the goal of walking to the front of a block with color x, (ii) second intermediate task "Get x" with the goal of picking up a block with color x, (iii) first intermediate task "Put x" with the goal of putting down a block with color x, and (iv) top task "Stack x" with the goal of stacking two blocks with color x together. In total, there can be 20-30 tasks and the agent can perform the following primitive actions: "move forward", "move backward", "move left", "move right", "turn left", "turn right", "pick up", and "put down".

Note that, in the above example, the second intermediate task of "Get x" is performed after the terminal task of "Find x" is performed, the first intermediate task of "Put x" is performed after the second intermediate task of "Get x" is performed, and the terminal task of "Stack x" is performed after the first intermediate task of "Put x' is performed. In the context of this application, this is what is meant by formulating a higher-level task or task set by using a lower-level task or task set as the base task or base task set. In other implementations, the selection of tasks for each level can be arbitrary and not follow the progression from simple tasks to complex tasks.

Thus, in the above example, the terminal task can be used to learn the terminal policy, such that the agents gets a positive reward upon reaching the goal of the terminal task, i.e., "Find x". The second intermediate task can be used to learn the second intermediate policy, such that the agents gets a positive reward upon reaching the goal of second intermediate task, i.e., "Get x". The first intermediate task can be used to learn the first intermediate policy, such that the agents gets a positive reward upon reaching the goal of first intermediate task, i.e., "Put x". The top task can be used to learn the top policy, such that the agents gets a positive reward upon reaching the goal of top task, i.e., "Stack x".

A base policy is determined from the perspective of a current policy level (also called global policy). A base policy is defined as a policy that is already learned by the agent on previously performed tasks or task sets and used to learn or implement a policy at the current policy level. Typically, the current policy level is the one that is immediately above the policy level of the base policy. In the above example, the terminal policy serves as the base policy of the second intermediate policy, the second intermediate policy serves as the base policy of the first intermediate policy, and the first intermediate policy serves as the base policy of the top policy.

In implementations, each of the policies can be learned over thousands of task iterations or episodes of training (e.g., 22000 episodes).

Figure 3:
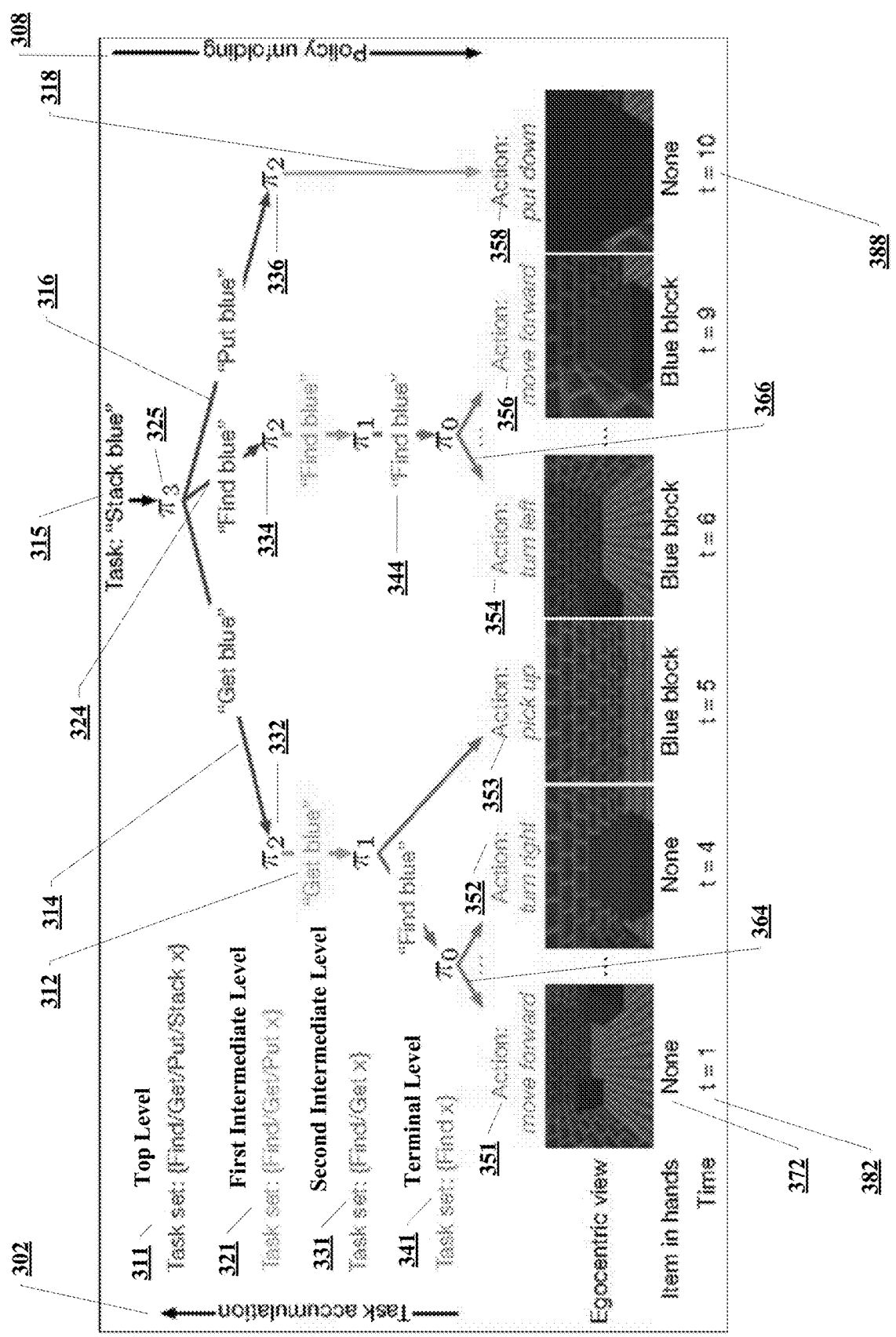
FIG. 3 shows an example of learning the disclosed multi-level hierarchical policy for a given specific task of stacking two blue blocks and of task accumulation across layers of the hierarchy.

FIG. 3 shows an example of the disclosed multi-level hierarchical policy for a given specific task of stacking two blue blocks: "Stack blue" 315. Given the instruction "Stack blue" 315, the disclosed hierarchical policy network learns to compose instructions and take multiple actions through a multi-level hierarchy in order to stack two blue blocks together. A series of terminal actions: move forward 351, turn right 352, pick up 353, turn left 354, move forward 356 and put down 358 are utilized to complete the task of stacking two blue blocks. Time is represented from left to right as t=1 382 through t=10 388. The egocentric view starts at time t=1 382 with no "items in hand" 372—that is, no blue blocks in this example. When traversing the hierarchy from the top down, the policy is unfolding. Each arrow 312, 314, 316, 318, 364 366 represents one step generated by a certain policy. To represent the skills and their relations in an interpretable way, the tasks are encoded using human instructions such as "put down" 378. This allows the agent to communicate its policy and generate plans using human language. Note that, in this context, tasks and instructions are treated as interchangeable concepts. The colors of arrows indicate the source policies, with top policy $\pi_3$ represented in red, first intermediate policy $\pi_2$ represented in orange, second intermediate policy $\pi_1$ represented in green, and terminal policy $\pi_0$ represented in blue text. Note that at each step, a policy either utters an instruction for the lower-level policy or directly takes an action.

Continuing with the example shown in FIG. 3, which includes unfolding the global policy 308 from top level to primitive actions, steps from the top policy $\pi_3$ 325 represented by red branches 314, 324, 316 outline a learned high-level plan: "Get blue 314→Find blue 324→Put blue 316". In addition, from lower level policies, one can see composed plans for other tasks. Based on first intermediate policy $\pi_2$ 332, 334, 336 for instance, the task "Get blue" 334 has two steps: "Find blue 344→ action: turn left 354"; and "Put blue" 336 can be executed by a single action "put down" 378 according to $\pi_2$. Through the disclosed hierarchical model, the agent can accumulate tasks progressively from a terminal task set, one or more intermediate task sets, and a top task set, and can unfold the global policy from the top policy to one or more intermediate policies to a terminal policy.

Traversing the hierarchy shown in FIG. 3 from the bottom up results in accumulating tasks 302 progressively from a terminal policy to a top policy. The colors of text for the task sets show accumulated tasks, with terminal task set "Find x" represented in blue text 341, second intermediate task set "Find/Get x" represented in green text 331, first intermediate task set "Find/Get/Put x" represented in orange 321, and top task set "Find/Get/Put/Stack x" represented in red 311.

The disclosed multitask reinforcement learning setting is described next. Switch policy classifier 182, instruction policy classifier 162 and augmented flat policy classifier 172 are jointly trained using reinforcement learning that includes evaluation of a binary variable from switch policy classifier 182 that determines whether to execute the current task by executing the previously-learned task or by performing the selected primitive action. With G as a task set, each task g is uniquely described by a human instruction. For simplicity, one can assume a two-word tuple template consisting of a skill and an item for such a phrase, with $g=<u_{skill}, u_{item}>$. Each tuple describes an object manipulation task, for example "get white" or "stack blue". For each task, one can define a Markov decision process (MDP) represented by states $s \in S$ and primitive actions $a \in A$ to model decision making, with the outcomes partly random and partly under the control of a decision maker. Rewards are specified for goals of different tasks. The disclosed network uses a function R(s, g) to signal the reward when performing any given task g. Assume that as a starting point, terminal policy $\pi_0$ is trained for a set of basic tasks such as a terminal task set $G_0$. The task set is then progressively increased to intermediate task sets and top task sets as the agent is instructed to do more tasks by humans at multiple stages, such that $G_0 \subset G_1 \subset \ldots \subset G_k$, which results in life-long learning of polices from $\pi_0$ (terminal policy) for $G_0$ to $\pi_k$ (top policy) for $G_k$ as illustrated by the "task accumulation" 302 direction in FIG. 3. At stage k>0, $G_{k-1}$ is defined as the base task set of $G_k$. The tasks in $G_{k-1}$ named as base tasks at this stage and $\pi_{k-1}$ becomes the base policy of $\pi_k$. The disclosed model is suitable for an arbitrary order of task augmentation. In one implementation, weak supervision from humans is utilized to define what tasks will be augmented to the previous task set at each new stage.

A new task in current task set $G_k$ may be decomposed into several simpler subtasks, some of which can be base tasks in $G_{k-1}$ executable by base policy $\pi_{k-1}$. Instead of using a flat policy that directly maps state and human instruction to a primitive action as policy $\pi_0$, the disclosed hierarchical design has the ability to reuse the base policy $\pi_{k-1}$ for performing base tasks as subtasks. Namely, at stage k, the global policy $\pi_k$ of global policy engine 122 is defined by a hierarchical policy. This hierarchy consists of four subpolicies: a base policy for executing previously learned tasks, an instruction policy that manages communication between the global policy and the base policy, an augmented flat policy which allows the global policy to directly execute actions, and a switch policy that decides whether the global policy will primarily rely on the base policy or the augmented flat policy.

The base policy is defined to be the global policy at the previous stage k−1. The instruction policy maps state s and task $g \in G_k$ to a base task $g' \in G_{k-1}$. The purpose of this policy is to inform base policy $\pi_{k-1}$ which base tasks it needs to execute. Since an instruction is represented by two words, the instruction policy is defined using two conditionally independent distributions. That is, $\pi_k^{inst}(g'=<u_{skill}, u_{item}>|s, g) = p_k^{skill}(u_{skill}|s, g) p_k^{item}(u_{item}|s, g)$. An augmented flat policy, $\pi_k^{aug}(a|s, g)$ maps state s and task g to a primitive action a for ensuring that the global policy is able to perform novel tasks in $G_k$ that cannot be achieved by only reusing the base policy. To determine whether to perform a base task or directly perform a primitive action at each step, the global policy further includes a switch policy $\pi_k^{inst}(e|s, g)$, where e is a binary variable indicating the selection of the branches, $\pi_k^{inst}(e=0)$ or $\pi_k^{aug}(e=1)$.

At each time step, the disclosed model first samples $e_t$ from switch policy $\pi_k^{SW}$ to decide whether the global policy $\pi_k$ will rely on the base policy $\pi_{k-1}$ or the augmented flat policy $\pi_k^{aug}$. The model also samples a new instruction $g'_t$ from instruction policy $\pi_k^{inst}$ in order to sample actions from the base policy. This can be summarized as $e_t \sim \pi_k^{SW}(e_t|s_t, g)$, $g'_t \sim \pi_k^{inst}(g'_t|s_t, g)$ and finally $a_t \sim \pi_k(a_t|s_t, g) = \pi_{k-1}(a_t|s_t, g'_t)^{(1-e_t)} \pi_k^{aug}(a_t|s_t, g)^{e_t}$, where $\pi_k$ and $\pi_{k-1}$ are the global policies at stage k and k−1 respectively. After each step, the disclosed model also obtains a reward $r_t = R(s_t, g)$.

Stochastic Temporal Grammar

Different tasks may have temporal relations. For instance, to move an object, one needs to first find and pick up that object. We summarize temporal transitions between various tasks with a stochastic temporal grammar (STG). In the full model, the STG interacts with the hierarchical policy described, through modified switch policy and instruction policy by using the STG as a prior. This amounts to treating the past history of switches and instructions in positive episodes as guidance on whether the hierarchical policy should defer to the base policy to execute a specific base task or employ its own augmented flat policy to take a primitive action.

FIG. 4 shows the equations that describe the estimated probabilities for an episode, with temporal sequence of $e_t$ 462 and $g'_t$ 474. At each level the model includes a STG of a task, as defined by the transition probabilities and the distribution of a finite state Markov chain. With the estimated probabilities, the model samples $e_t$ and $g'_t$ in an episode at level k>0 with respect to reshaped policies $\pi_k^{SW'}$ and $\pi_k^{inst'}$. If at any point in the training process the agent receives a positive reward after an episode, the stochastic temporal grammar gets updated.

FIG. 5 shows a disclosed algorithm for composing a plan for a complex task based on simpler tasks which are specified by a human instruction. Algorithm 1 RUN(k, g) 512 takes as input policy level k, task $g \in G_k$ for combining the disclosed hierarchical policy and STG with respect to the policy and STG at level k. Note that to fully utilize the base policy, the model assumes that once triggered, a base policy will play to the end before the global policy considers the next move.

Curriculum Learning

FIG. 6 shows a learning algorithm 612 for learning the final hierarchical policy through k stages of skill acquisition. Each of these stages is broken down into a base skill acquisition phase and a novel skill acquisition phase in two-phase curriculum learning. In the base skill acquisition phase, the model only samples tasks from the base task set $G_{k-1}$ to ensure that the global policy learns how to use previously learned skills by issuing instructions to the base policy. In other words, this phase teaches the agent how to connect its instruction policy to its base policy. Once the average reward for all base tasks exceeds a certain threshold, then the agent proceeds to the next phase. In the novel skill acquisition phase, the model samples tasks from the full task set, $G_k$ for the $k^{th}$ stage of skill acquisition. It is in this phase that the agent can learn when to rely on the base policy and when to rely on the augmented flat policy for executing novel tasks. In each the described phases, all policies are trained with advantage actor-critic (A2C). Distributions in the STG are estimated based on accumulated positive episode only considering the gradient for global policies (i.e., k>0), assuming the terminal policy has been trained as initial condition.

Experimental Results

The disclosed technology is validated on Minecraft games designed to explicitly test the ability to reuse previously learned skills while simultaneously learning new skills. Details of the experimental setup for the game environment and task specification are described in detail in "HIERARCHICAL AND INTERPRETABLE SKILL ACQUISITION IN MULTI-TASK REINFORCEMENT LEARNING" which is hereby incorporated by reference herein for all purposes.

FIG. 7 shows success rates in different game environments, with all policies trained in a small room 724. To evaluate the learning efficiency, the results for the disclosed full model 732 are compared with a flat policy 742 fine-tuned on the terminal policy $\pi_0$. Note that all the rewards have been converted to the same range, [0, 1] for the sake of fair comparison.

Figure 8A:
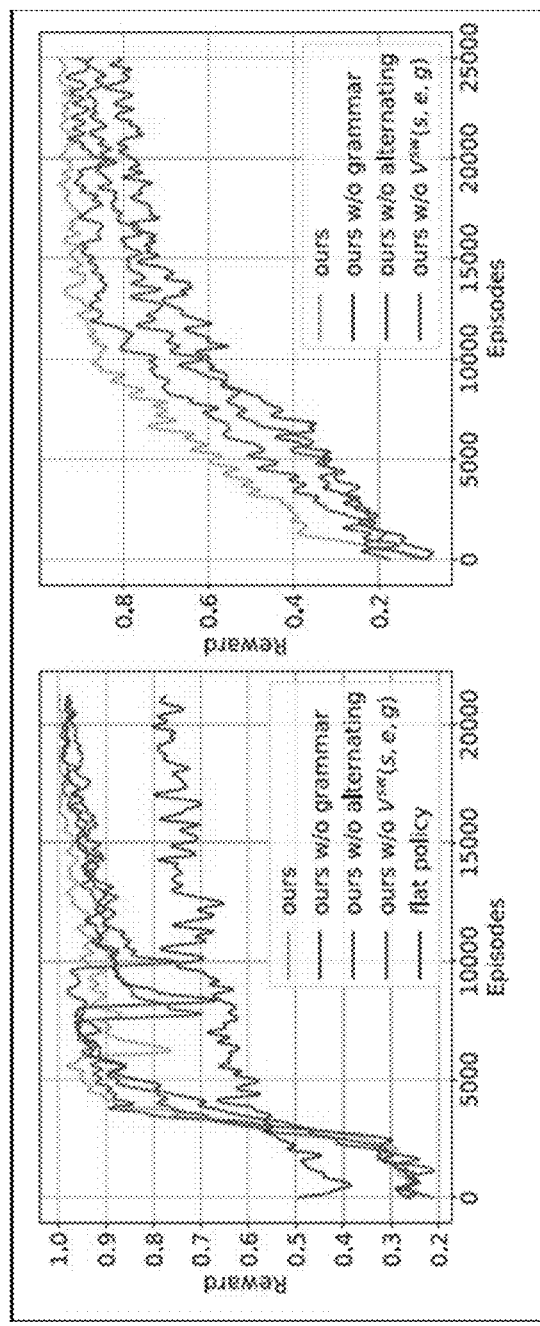
FIG. 8A shows a comparison of learning efficiency on two task sets: $G_1$ for global policy $\pi_1$ and $G_3$ for global policy $\pi_3$ respectively.
Figure 8B:
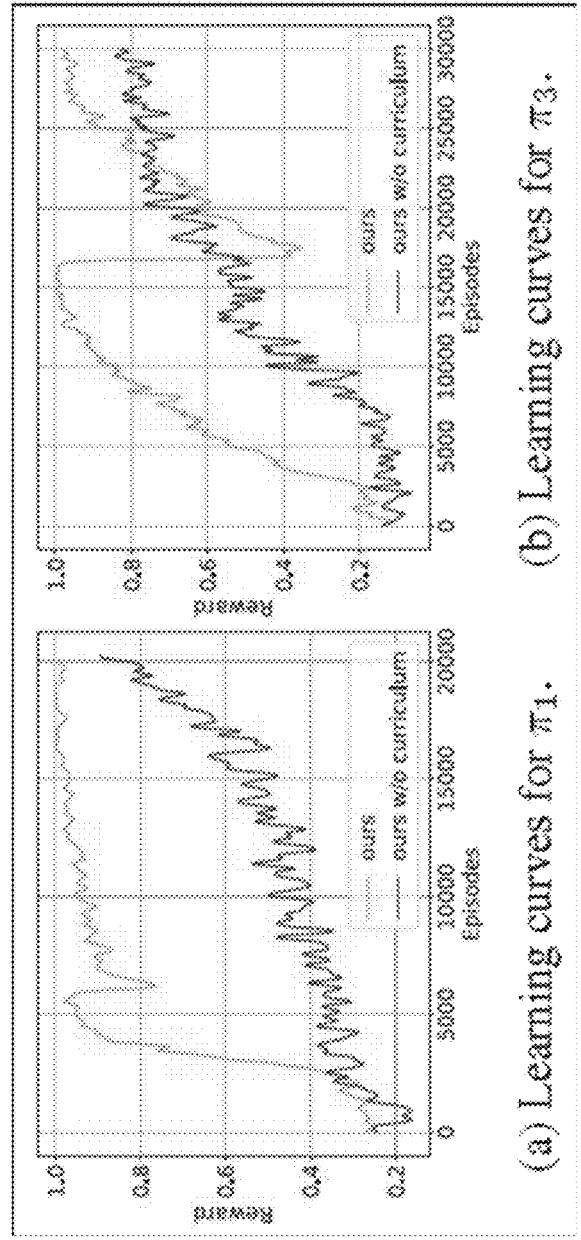
FIG. 8B shows the effect of applying two-phase curriculum learning, in accordance with one or more implementations of the technology disclosed.

FIG. 8A shows a comparison of learning efficiency on two task sets: $G_1$ for global policy $\pi_1$ and $G_3$ for global policy $\pi_3$ respectively. FIG. 8B shows the effect of applying two-phase curriculum learning, as described relative to learning algorithm 612.

The disclosed hierarchal policy network includes efficient multi-task reinforcement learning through multiple training stages. Each task in the disclosed settings is described by a human instruction. The resulting global policy is able to reuse previously learned skills for new tasks by generating corresponding human instructions to inform base policies to execute relevant base tasks. The disclosed network has a significantly higher learning efficiency than a flat policy has, generalizes well in unseen environments, and is capable of composing hierarchical plans in an interpretable manner.

Computer System

Figure 9:
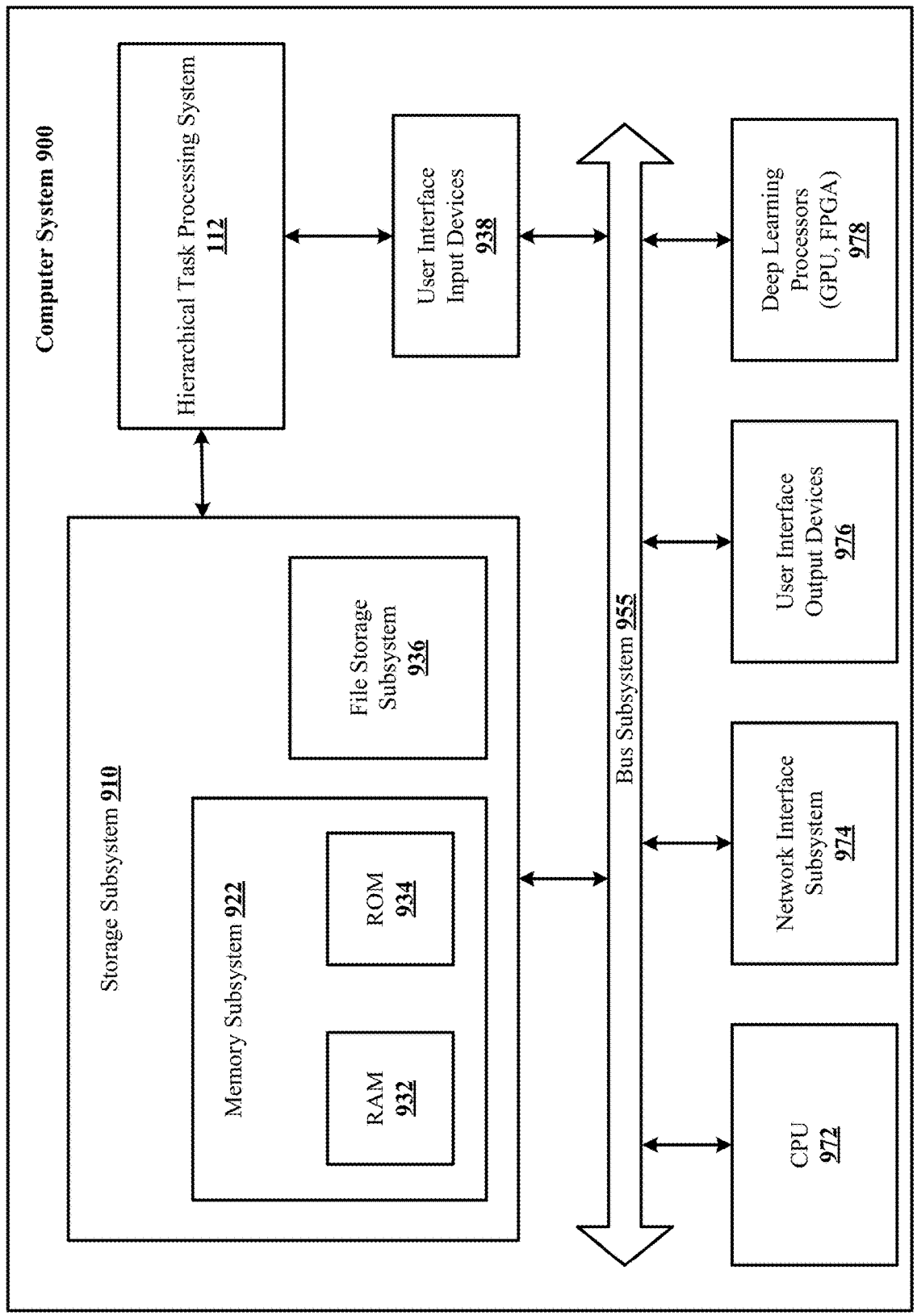
FIG. 9 is a block diagram of a computer system that can be used to implement the technology disclosed.

FIG. 9 is a simplified block diagram of a computer system 900 that can be used to implement the technology disclosed. Computer system 900 includes at least one central processing unit (CPU) 972 that communicates with a number of peripheral devices via bus subsystem 955. These peripheral devices can include a storage subsystem 910 including, for example, memory devices and a file storage subsystem 936, user interface input devices 938, user interface output devices 976, and a network interface subsystem 974. The input and output devices allow user interaction with computer system 900. Network interface subsystem 974 provides an interface to outside networks, including an interface to corresponding interface devices in other computer systems.

In one implementation, the hierarchical task processing system 112 of FIG. 1 is communicably linked to the storage subsystem 910 and the user interface input devices 938.

User interface input devices 938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 900.

User interface output devices 976 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 900 to the user or to another machine or computer system.

Storage subsystem 910 stores programming and data constructs that provide the functionality of some or all of the modules and methods described herein. These software modules are generally executed by deep learning processors 978.

Deep learning processors 978 can be graphics processing units (GPUs) or field-programmable gate arrays (FPGAs). Deep learning processors 978 can be hosted by a deep learning cloud platform such as Google Cloud Platform™, Xilinx™, and Cirrascale™. Examples of deep learning processors 978 include Google's Tensor Processing Unit (TPU)™, rackmount solutions like GX4 Rackmount Series™, GX8 Rackmount Series™, NVIDIA DGX-1™, Microsoft' Stratix V FPGA™, Graphcore's Intelligent Processor Unit (IPU)™, Qualcomm's Zeroth Platform™ with Snapdragon processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, and others.

Memory subsystem 922 used in the storage subsystem 910 can include a number of memories including a main random access memory (RAM) 932 for storage of instructions and data during program execution and a read only memory (ROM) 934 in which fixed instructions are stored. A file storage subsystem 936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 936 in the storage subsystem 910, or in other machines accessible by the processor.

Bus subsystem 955 provides a mechanism for letting the various components and subsystems of computer system 900 communicate with each other as intended. Although bus subsystem 955 is shown schematically as a single bus, alternative implementations of the bus subsystem can use multiple busses.

Computer system 900 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 900 depicted in FIG. 9 is intended only as a specific example for purposes of illustrating the preferred embodiments of the present invention. Many other configurations of computer system 900 are possible having more or less components than the computer system depicted in FIG. 9.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Some Particular Implementations

Some particular implementations and features are described in the following discussion.

One disclosed implementation includes a hierarchical policy network, running on numerous parallel processors coupled to memory, for use by an agent running on a processor to accomplish an objective that requires execution of multiple tasks, comprising a terminal policy learned by training the agent on a terminal task set, an intermediate policy learned by training the agent on an intermediate task set, and a top policy learned by training the agent on a top task set. The disclosed terminal policy serves as a base policy of the intermediate policy and the terminal task set serves as a base task set of the intermediate task set, and the intermediate policy serves as a base policy of the top policy and the intermediate task set serves as a base task set of the top task set. The disclosed agent is configurable to accomplish the objective by traversal of the hierarchical policy network, decomposition of one or more tasks in the top task set into tasks in the intermediate task set, and further decomposition of one or more tasks in the intermediate task set into tasks in the terminal task set. During the decomposition, a current task in a current task set is executed by executing a previously-learned task selected from a corresponding base task set governed by a corresponding base policy, or performing a primitive action selected from a library of primitive actions. In another implementation, the disclosed hierarchical policy network can include additional intermediate policy learned by training the agent on previous layers of task sets, resulting in more than three layers in the hierarchy.

This network and other implementations of the technology disclosed can optionally include one or more of the following features and/or features described in connection with the disclosed network. In the interest of conciseness, alternative combinations of features disclosed in this application are not individually enumerated. Features applicable to systems, methods, and articles of manufacture are not repeated for each statutory class set of base features. The reader will understand how features identified in this section can readily be combined with base features in other statutory classes.

In some implementations, the disclosed hierarchical policy network, the selected primitive action is a novel primitive action that is performed when the current task is a novel task. In this context, a novel task is one that cannot be achieved by only reusing the base policy.

In one implementation, the disclosed hierarchical policy network comprises a visual encoder trained to extract feature maps from an image of an environment view of the agent, and encode the features maps in a visual representation, an instruction encoder trained to encode a natural language instruction specifying the current task into embedded vectors, and combine the embedded vectors into a bag-of-words (abbreviated BOW) representation, a fusion layer that concatenates the visual representation and the BOW representation and outputs a fused representation, a long short-term memory (abbreviated LSTM) trained to process the fused representation and output a hidden representation, a switch policy classifier trained to process the hidden representation and determine whether to execute the current task by executing the previously-learned task or by performing the primitive action, an instruction policy classifier trained to process the hidden representation when the switch policy classifier determines that the current task is to be executed by executing the previously-learned task, and select the previously-learned task from the corresponding base task set and emit a natural language description of the selected previously-learned task, an augmented flat policy classifier trained to process the hidden representation when the switch policy classifier determines that the current task is to be executed by performing the primitive action, and select the primitive action from the library of primitive actions, and an action processor that, based on the switch policy classifier's determination, implements one or more primitive actions of the selected previously-learned task or the selected primitive action.

For some implementations of the disclosed hierarchical policy network, the switch policy classifier, the instruction policy classifier and the augmented flat policy classifier are jointly trained using reinforcement learning that includes evaluation of a binary variable from the switch policy classifier that determines whether to execute the current task by executing the previously-learned task or by performing the selected primitive action.

In one implementation, the disclosed hierarchical policy network is learned by training the agent on a progression of task sets, beginning with the terminal task set and continuing with the intermediate task set and with the top task set. The terminal task set is formulated by selecting a set of primitive actions from the library of primitive actions, the intermediate task set is formulated by making available the formulated terminal task set as the base task set of the intermediate task set, and the top task set is formulated by making available the formulated intermediate task set as the base task set of the top task set.

In some implementations, the disclosed hierarchical policy network task complexity varies between the terminal task set, the intermediate task set, and the top task set. In one implementation, the task complexity increases from the terminal task set to the intermediate task set and the top task set.

In one implementation of the disclosed hierarchical policy network, respective tasks of the terminal task set, the intermediate task set, and the top task set are randomly selected.

In some implementations, the hierarchical policy network comprises a plurality of intermediate policies learned by training the agent on a plurality of intermediate task sets.

In some implementations of the disclosed hierarchical policy network, a lower intermediate policy serves as a base policy of a higher intermediate policy and a lower intermediate task set serves as a base task set of a higher intermediate task set.

In one implementation of the disclosed hierarchical policy network, the visual encoder includes a convolutional neural network (abbreviated CNN), and the instruction encoder includes an embedding network and a BOW network.

In some implementations of the disclosed hierarchical policy network, the switch policy classifier includes a fully-connected (abbreviated FC) network, followed by a softmax classification layer.

In some implementations of the disclosed hierarchical policy network, the instruction policy classifier includes a first pair of a FC network and a successive softmax classification layer for selecting the previously-learned task from the corresponding base task set, and a second pair of a FC network and a successive softmax classification layer for emitting the natural language description of the selected previously-learned task.

In one implementation of the disclosed hierarchical policy network, the augmented flat policy classifier includes a FC network, followed by a softmax classification layer.

In one implementation of the disclosed hierarchical policy network, the terminal policy is learned by training the agent on the terminal task set over twenty thousand episodes.

In one implementation of the disclosed hierarchical policy network, the intermediate policy is learned by training the agent on the intermediate task set over twenty thousand episodes.

In one implementation of the disclosed hierarchical policy network, the top policy is learned by training the agent on the top task set over twenty thousand episodes.

One disclosed method of accomplishing, through an agent, an objective that requires execution of multiple tasks, includes accessing a hierarchical policy network that comprises a terminal policy, an intermediate policy, and a top policy, wherein the terminal policy is learned by training the agent on a terminal task set, the intermediate policy is learned by training the agent on an intermediate task set, and the top policy is learned by training the agent on a top task set, and the terminal policy serves as a base policy of the intermediate policy and the terminal task set serves as a base task set of the intermediate task set, and the intermediate policy serves as a base policy of the top policy and the intermediate task set serves as a base task set of the top task set. The method also includes accomplishing the objective by traversing the hierarchical policy network and decomposing one or more tasks in the top task set into tasks in the intermediate task set, and further decomposing one or more tasks in the intermediate task set into tasks in the terminal task set. The method further includes, during the decomposing, executing a current task in a current task set by executing a previously-learned task selected from a corresponding base task set governed by a corresponding base policy, or performing a primitive action selected from a library of primitive actions.

In one implementation of the disclosed method, the selected primitive action is a novel primitive action that is performed when the current task is a novel task.

Another disclosed implementation includes a non-transitory computer readable storage medium impressed with computer program instructions to accomplish, through an agent, an objective that requires execution of multiple tasks, the instructions, when executed on a processor, implement a method comprising accessing a hierarchical policy network that comprises a terminal policy, an intermediate policy, and a top policy, wherein the terminal policy is learned by training the agent on a terminal task set, the intermediate policy is learned by training the agent on an intermediate task set, and the top policy is learned by training the agent on a top task set, and the terminal policy serves as a base policy of the intermediate policy and the terminal task set serves as a base task set of the intermediate task set, and the intermediate policy serves as a base policy of the top policy and the intermediate task set serves as a base task set of the top task set. The method also includes accomplishing the objective by traversing the hierarchical policy network and decomposing one or more tasks in the top task set into tasks in the intermediate task set, and further decomposing one or more tasks in the intermediate task set into tasks in the terminal task set. The method further includes, during the decomposing, executing a current task in a current task set by executing a previously-learned task selected from a corresponding base task set governed by a corresponding base policy, or performing a primitive action selected from a library of primitive actions.

In some implementations of the non-transitory computer readable storage medium, the selected primitive action is a novel primitive action that is performed when the current task is a novel task.

In another implementation, the technology disclosed presents a task plan articulation subsystem that articulates a plan formulated by a hierarchical task processing system. The task plan articulation subsystem runs on a processor and memory coupled to the processor.

The task plan articulation subsystem comprises an input path. The input path receives a selected output that indicates whether to use a previously learned task or to apply an augmented flat policy to discover a primitive action in order to respond to a natural language instruction that specifies an objective that requires execution of multiple tasks to accomplish. The previously learned tasks are arranged in a hierarchy comprising top tasks, intermediate tasks, and terminal tasks, and each previously learned task in the hierarchy has a natural language label applied to the task and to a branch node under which the task is organized. A newly discovered primitive action receives a natural language label applied to the newly discovered primitive action and to a branch node under which the newly discovered primitive action is organized.

The task plan articulation subsystem also comprises a query responder. The query responder receives a request for a plan of execution and articulates the natural language labels for the branch node and the tasks and primitive actions under the branch node of the selected output as a plan for consideration and approval or rejection.

The hierarchical task processing system can interact with a supplementary stochastic temporal grammar model that uses history of switches and instructions in positive episodes to modulate when to use the previously learned task and when to discover the primitive action. The hierarchical task processing system can be trained using a two-phase curriculum learning.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

We claim as follows:

1. A system for a hierarchical policy network, comprising:
a memory storing a plurality of processor-executable instructions; and
a plurality of parallel processors coupled to the memory, reading the processor-executable instructions to perform operations comprising:
training an agent according to a hierarchy of policies, the hierarchy comprising:
a terminal policy learned by training the agent on a terminal task set formulated by a set of primitive actions,
an intermediate policy learned by training the agent on an intermediate task set formulated by a first set of continual actions continued from the terminal task set, and
a top policy learned by training the agent on a top task set formulated by a second set of continual actions continued from the top task set;
wherein the terminal policy serves as a base policy of the intermediate policy and the terminal task set serves as a base task set of the intermediate task set, and the intermediate policy serves as a base policy of the top policy and the intermediate task set serves as a base task set of the top task set;
in response to a task request for one or more tasks in the top task set, traversing the hierarchical policy network to decompose the one or more tasks in the top task set into one or more intermediate tasks in the intermediate task set, and further decompose the one or more intermediate tasks in the intermediate task set into one or more terminal tasks in the terminal task set; and
during each step of decomposition:
determining a current task set comprising one or more current tasks decomposed from the one or more tasks at a respective hierarchical level in the hierarchy of policies,
determining whether a current task in the current task set is executable by a single primitive action,
generating an instruction indicating a lower-level policy in the hierarchy of policies for a next step of decomposition when the current task in the current task set is not executable in the single primitive action, and
performing the single primitive action to complete the current task when the current task is executable by the single primitive action.

2. The hierarchical policy network of claim 1, wherein the selected primitive action is a novel primitive action that is performed when the current task is a novel task.

3. The hierarchical policy network of claim 1, further comprising:
a visual encoder trained to extract feature maps from an image of an environment view of the agent, and encode the features maps in a visual representation;
an instruction encoder trained to encode a natural language instruction specifying the current task into embedded vectors, and combine the embedded vectors into a bag-of-words (abbreviated BOW) representation;
a fusion layer that concatenates the visual representation and the BOW representation and outputs a fused representation;
a long short-term memory (abbreviated LSTM) trained to process the fused representation and output a hidden representation;
a switch policy classifier trained to process the hidden representation and determine whether to execute the current task by executing the previously-learned task or by performing the primitive action;
an instruction policy classifier trained to process the hidden representation when the switch policy classifier determines that the current task is to be executed by executing the previously-learned task, and select the previously-learned task from the corresponding base task set and emit a natural language description of the selected previously-learned task;
an augmented flat policy classifier trained to process the hidden representation when the switch policy classifier determines that the current task is to be executed by performing the primitive action, and select the primitive action from the library of primitive actions; and
an action processor that, based on the switch policy classifier's determination, implements one or more primitive actions of the selected previously-learned task or the selected primitive action.

4. The hierarchical policy network of claim 3, wherein the switch policy classifier, the instruction policy classifier and the augmented flat policy classifier are jointly trained using reinforcement learning that includes evaluation of a binary variable from the switch policy classifier that determines whether to execute the current task by executing the previously-learned task or by performing the selected primitive action.

5. The hierarchical policy network of claim 1, wherein the hierarchical policy network is learned by training the agent on a progression of task sets, beginning with the terminal task set and continuing with the intermediate task set and with the top task set.

6. The hierarchical policy network of claim 5, wherein the terminal task set is formulated by selecting a set of primitive actions from the library of primitive actions, the intermediate task set is formulated by making available the formulated terminal task set as the base task set of the intermediate task set, and the top task set is formulated by making available the formulated intermediate task set as the base task set of the top task set.

7. The hierarchical policy network of claim 6, wherein task complexity varies between the terminal task set, the intermediate task set, and the top task set.

8. The hierarchical policy network of claim 7, wherein the task complexity increases from the terminal task set to the intermediate task set and the top task set.

9. The hierarchical policy network of claim 8, wherein respective tasks of the terminal task set, the intermediate task set, and the top task set are randomly selected.

10. The hierarchical policy network of claim 1, wherein the hierarchical policy network comprises a plurality of intermediate policies learned by training the agent on a plurality of intermediate task sets.

11. The hierarchical policy network of claim 10, wherein a lower intermediate policy serves as a base policy of a higher intermediate policy and a lower intermediate task set serves as a base task set of a higher intermediate task set.

12. The hierarchical policy network of claim 3, wherein the visual encoder includes a convolutional neural network (abbreviated CNN).

13. The hierarchical policy network of claim 3, wherein the instruction encoder includes an embedding network and a BOW network.

14. The hierarchical policy network of claim 3, wherein the switch policy classifier includes a fully-connected (abbreviated FC) network, followed by a softmax classification layer.

15. The hierarchical policy network of claim 3, wherein the instruction policy classifier includes a first pair of a FC network and a successive softmax classification layer for selecting the previously-learned task from the corresponding base task set, and a second pair of a FC network and a successive softmax classification layer for emitting the natural language description of the selected previously-learned task.

16. The hierarchical policy network of claim 3, wherein the augmented flat policy classifier includes a FC network, followed by a softmax classification layer.

17. The hierarchical policy network of claim 1, wherein the terminal policy is learned by training the agent on the terminal task set over twenty thousand episodes.

18. The hierarchical policy network of claim 1, wherein the intermediate policy is learned by training the agent on the intermediate task set over twenty thousand episodes.

19. The hierarchical policy network of claim 1, wherein the top policy is learned by training the agent on the top task set over twenty thousand episodes.

20. A method of accomplishing, through an agent, an objective that requires execution of multiple tasks through a hierarchical policy network, including:
training an agent according to a hierarchy of policies that comprises a terminal policy, an intermediate policy, and a top policy,
wherein the terminal policy is learned by training the agent on a terminal task set formulated by a set of primitive actions,
the intermediate policy is learned by training the agent on an intermediate task set formulated by a first set of continual actions continued from the terminal task set, and
the top policy is learned by training the agent on a top task set formulated by a second set of continual actions continued from the top task set;
wherein the terminal policy serves as a base policy of the intermediate policy and the terminal task set serves as a base task set of the intermediate task set, and the intermediate policy serves as a base policy of the top policy and the intermediate task set serves as a base task set of the top task set;
in response to a task request for one or more tasks in the top task set, traversing the hierarchical policy network, whereas decomposing one or more tasks in the top task set into one or more intermediate tasks in the intermediate task set, and further decomposing the one or more intermediate tasks in the intermediate task set into one or more terminal tasks in the terminal task set; and
during each step of decomposing:
determining a current task set comprising one or more current tasks decomposed from the one or more tasks at a respective hierarchical level in the hierarchy of policies,
determining whether a current task in the current task set is executable by a single primitive action,
generating an instruction indicating a lower-level policy in the hierarchy of policies for a next step of decomposition when the current task in the current task set is not executable in the single primitive action, and
performing the single primitive action to complete the current task when the current task is executable by the single primitive action.

21. The method of claim 20, wherein the selected primitive action is a novel primitive action that is performed when the current task is a novel task.

22. A non-transitory computer readable storage medium impressed with computer program instructions to accomplish, through an agent, an objective that requires execution of multiple tasks through a hierarchical policy network, the instructions, when executed on a processor, implement a method comprising:
training an agent according to a hierarchy of policies that comprises a terminal policy, an intermediate policy, and a top policy,
wherein the terminal policy is learned by training the agent on a terminal task set formulated by a set of primitive actions,
the intermediate policy is learned by training the agent on an intermediate task set formulated by a first set of continual actions continued from the terminal task set, and
the top policy is learned by training the agent on a top task set formulated by a second set of continual actions continued from the top task set;
wherein the terminal policy serves as a base policy of the intermediate policy and the terminal task set serves as a base task set of the intermediate task set, and the intermediate policy serves as a base policy of the top policy and the intermediate task set serves as a base task set of the top task set;
in response to a task request for one or more tasks in the top task set, traversing the hierarchical policy network, whereas decomposing one or more tasks in the top task set into one or more intermediate tasks in the intermediate task set, and further decomposing the one or more intermediate tasks in the intermediate task set into one or more terminal tasks in the terminal task set; and
during each step of decomposing:
determining a current task set comprising one or more current tasks decomposed from the one or more tasks at a respective hierarchical level in the hierarchy of policies,
determining whether a current task in the current task set is executable by a single primitive action,
generating an instruction indicating a lower-level policy in the hierarchy of policies for a next step of decomposition when the current task in the current task set is not executable in the single primitive action, and
performing the single primitive action to complete the current task when the current task is executable by the single primitive action.

* * * * *